United States Patent [19]
Piltingsrud

[11] 3,792,280
[45] Feb. 12, 1974

[54] ISOTROPIC NEUTRON SPECTROMETER

[75] Inventor: Harley V. Piltingsrud, Idaho Falls, Idaho

[73] Assignee: The United States of America as represented by the Secretary of the United States Air Force, Washington, D.C.

[22] Filed: Nov. 3, 1972

[21] Appl. No.: 303,438

[52] U.S. Cl............................ 250/390, 250/484
[51] Int. Cl............................ G01t 3/00, G01t 1/11
[58] Field of Search .... 250/337, 390, 391, 392, 484

[56] References Cited
UNITED STATES PATENTS
3,290,500  12/1966  Bokhari et al. ................ 250/391
3,420,999  1/1969  Distenfeld ...................... 250/391

Primary Examiner—Archie R. Borchelt

[57] ABSTRACT

An isotropic neutron spectrometer having a plurality of radial polyethylene rods positioned in bore holes angularly spaced around a polyethylene sphere with thermoluminescent dosimeter pairs positioned at spaced intervals along the rods. A TLD pair is also located in the center of the sphere.

4 Claims, 8 Drawing Figures

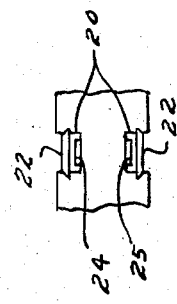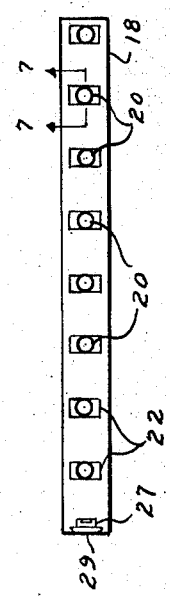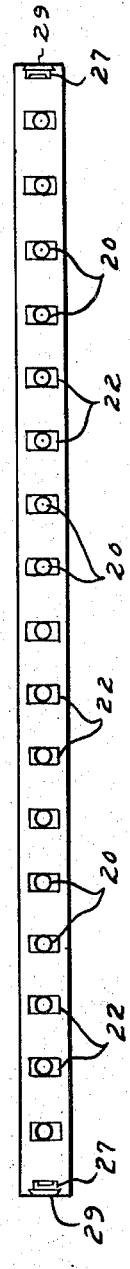

ISOTROPIC NEUTRON SPECTROMETER

BACKGROUND OF THE INVENTION

Thermoluminescent dosimeters have been used in mixed radiation fields to discriminate between different types of radiation.

The patents to Distenfield, U.S. Pat. No. 3,420,999, and Attix, U.S. Pat. No. 3,484,605, describe apparatus with thermoluminescent dosimeters (TLDs) used for this purpose.

In one prior art device, an 18 inch diameter polyethylene sphere is positioned on a rotating mechanism for determining average neutron energy and fluence in a radiation field.

Six TLDs of LiF made of $Li^6$ and two TLDs of LiF made of $Li^7$ are placed at intervals along a single polyethylene rod which is inserted in a bore in the 18 inch sphere. A like packet is taped at the end of the rod. The use of such apparatus, however, requires the use of rotating machinery which makes the apparatus not practicable for certain uses, such as at high altitudes aboard an aircraft, due to the power and space requirements of the rotating machinery. Also, since this apparatus is rotated around a single axis so that the rod moves in only one plane, such a system will not provide an isotropic response.

Furthermore, these systems do not provide for the determination of the directional properties of the incident radiation.

BRIEF SUMMARY OF THE INVENTION

According to this invention, TLD pairs, of LiF made of $Li^6$ and LiF made of $Li^7$, are positioned at one inch intervals along a plurality of polyethylene rods. The rods are located in radial bore holes at angularly spaced positions in a polyethylene sphere. A TLD pair is positioned at the center of the sphere. A TLD pair is also positioned at the outer end of each of the rods.

IN THE DRAWING

FIG. 5 is an enlarged side view of one of the rods of FIG. 1.

FIG. 6 is an enlarged side view of the rod of FIG. 1 which is positioned along a diameter of the sphere.

FIG. 7 is a partially cut away enlarged sectional view of the device of FIG. 6 along the line 7—7.

DETAILED DESCRIPTION OF THE INVENTION

Figure 1:
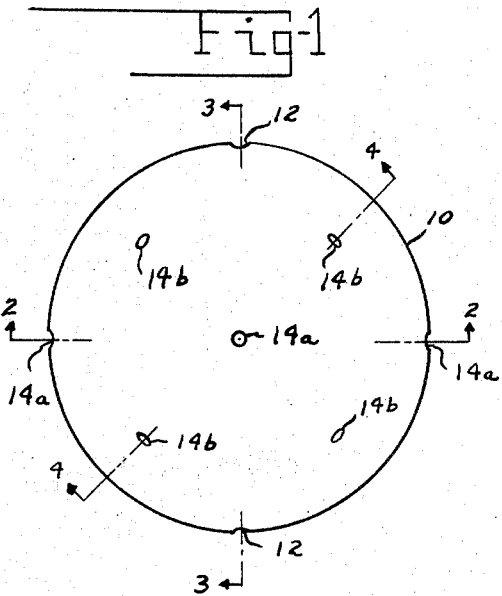
FIG. 1 is a front elevation view of a spherical isotropic neutron spectrometer according to the invention.
Figure 2:
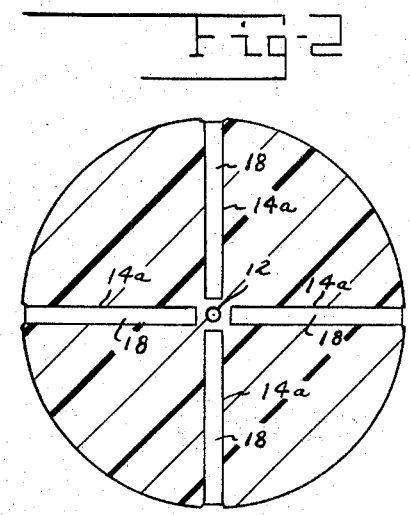
FIG. 2 is a sectional view of the device of FIG. 1 along the lines 2—2 with the rods shown in full.
Figure 3:
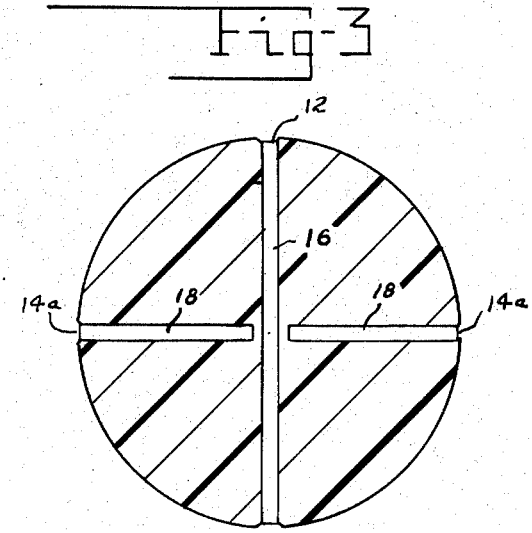
FIG. 3 is a sectional view of the device of FIG. 1 along the line 3—3 with the rods shown in full.
Figure 4:
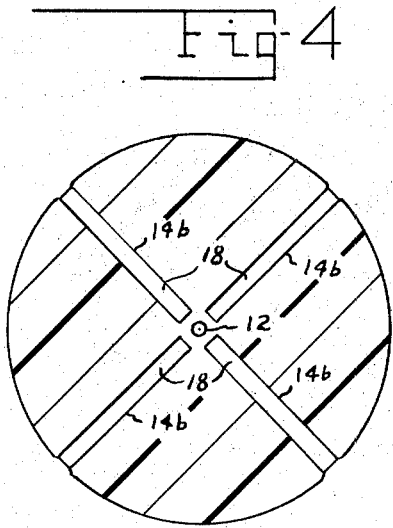
FIG. 4 is a sectional view of the device of FIG. 1 along the line 4—4 with the rods shown in full.
Figure 8:
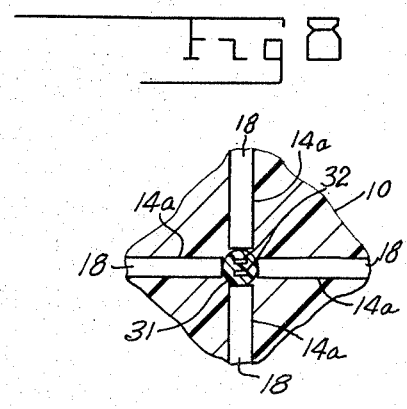
FIG. 8 is a partially cut away sectional view of a modification of the invention, corresponding to the showing in FIG. 2.

Referring now to FIG. 1 of the drawing, a large polyethylene sphere is shown at 10. The sphere has one bore hole 12 passing through the sphere as shown in FIG. 3 and four bore holes 14a and eight bore holes 14b extending to a position adjacent the center of the sphere, as shown in FIGS. 2, 3 and 4. The bore holes 14a are positioned in a plane perpendicular to bore hole 12 and shown in FIG. 2. Bore holes 14b are located at angles of 45° with respect to the planes shown in FIGS. 2 and 3.

With the bore holes located as described, an approximately uniform distribution of the TLD pairs in the sphere is provided. However, the ideal distribution would be with the TLD pairs located in bore holes at equal angular spaced positions in the sphere. Where needed these may be provided.

The rod 16 positioned in bore hole 12 has cylindrical recesses 20 spaced at one inch intervals along the rod on two opposite sides, as shown in FIGS. 6 and 7. Polyethylene cover members 22 close the recesses to hold TLD chips 24 and 25. The TLDs 24 of LiF made of $Li^6$ are positioned in the recesses on one side of the rod 16 and the TLDs 25 of LiF made of $Li^7$ are positioned in the recesses on the opposite side of the rod 16. A TLD pair is located in each of the recesses 27 at the opposite ends of rod 16 and are held by cover members 29. While the TLD pairs were located at equal intervals along the rod, other spacing may be used in some applications.

Rods 18 positioned in bore holes 14a and 15b are as shown in FIG. 5. Rods 18 also have recesses 20 and 27 with covers 22 and 29 for holding TLDs in the same manner as rod 16.

In the operation of the apparatus, rods 16 and 18 with the TLDs in place are positioned in the bore holes in sphere 10. The sphere is then positioned in the area where it is desired to determine the neutron fields, such as aboard an aircraft for flight at a high altitude or around a high-energy particle accelerator. After the sphere has been exposed to such radiation, the radiation field is evaluated by reading each TLD in an analyzer such as described in the Distenfeld patent. The TLDs made of $Li^7$ measures gammas and charged particles only and the $Li^6$ measures gammas, charged particles and thermal neutrons. The difference between the $Li^6$ reading and the $Li^7$ reading in the analyzer is due to the thermal neutrons. By averaging the reading at equal distance from the center of the sphere, an indication similar to that derived in the rotating apparatus is achieved except that a more nearly isotropic response is obtained.

By observing the readings as a function of response direction, a directional response characteristic may be obtained. In devices constructed, two sphere sizes have been used, some with 8 inches diameter and some with 18 inches diameter. While the smaller spheres are cheaper to build and easier to handle and are useful in lower energy fields, the larger spheres are needed for evaluating radiation fields where very high energy neutrons are present.

In one device constructed, all the rods were the same and located in radial bore holes 14a and 14b around a small sphere 31 located in the center of the large sphere with the center TLD pair 32 being located in the center of the small sphere.

While the TLD chips have been described as being located in recesses in the rods, other holders may be provided, for example, in one device built cross bores were provided in the rod with small round rod shaped TLD containers being located in the cross bores.

The spheres were fabricated of laminated 1 ½ inches thick section of polyethylene sheet. This greatly reduced the fabrication and material costs.

There is thus provided an isotropic neutron spectrometer that is a completely passive device which may be used in the measurement of flux and energy spectrum of neutrons in mixed radiation fields.

I claim:

1. An isotropic neutron spectrometer comprising: a polyethylene sphere having a predetermined diameter; said sphere having a plurality of radially disposed bore holes angularly spaced around said sphere; a polyethylene rod positioned in each of the bore holes; means for holding TLD pairs of LiF made with $Li^6$ and LiF made with $Li^7$ at spaced intervals along said rods with the TLD pairs on all the rods being spaced at corresponding equal distances from the center of the sphere; means for holding a like TLD pair at the outer end of each rod; means for holding a like TLD pair at the center of said sphere.

2. The device as recited in claim 1, wherein one of said rods passes through the sphere along a diameter with the TLD pair at the center of the sphere being held by said rod.

3. The device as recited in claim 1, wherein a small polyethylene sphere is positioned at the center of said polyethylene sphere with all of said rods abutting said small sphere; the TLD pair in the center of the said sphere being held by said small sphere.

4. The device as recited in claim 1, wherein the TLD spaced along the rod are held in a covered recess in said rods with the TLDs with $Li^6$ being located on one side of the rods and the TLDs with $Li^7$ being located on the opposite side of the rods.

* * * * *